US009079145B2

(12) United States Patent
Baranowski et al.

(10) Patent No.: US 9,079,145 B2
(45) Date of Patent: Jul. 14, 2015

(54) SOLIDS PROCESSING VALVE (75) Inventors: Don Baranowski, Saginaw, MI (US); Matthew Bishop, Saginaw, MI (US); Max Dehtiar, Saginaw, MI (US); Michael John Molnar, Freeland, MI (US); P. Christian Naberhaus, Ft. Thomas, KY (US)

(73) Assignee: HEMLOCK SEMICONDUCTOR CORPORATION, Hemlock, MI (US)

( * ) Notice: Subject to any disclaimer, the term of this patent is extended or adjusted under 35 U.S.C. 154(b) by 0 days.

(21) Appl. No.: 14/126,323

(22) PCT Filed: Jun. 14, 2012
(Under 37 CFR 1.47)

(86) PCT No.: PCT/US2012/042438
§ 371 (c)(1),
(2), (4) Date: Dec. 13, 2013

(87) PCT Pub. No.: WO2012/174228
PCT Pub. Date: Dec. 20, 2012

(65) Prior Publication Data
US 2014/0348712 A1 Nov. 27, 2014

Related U.S. Application Data (60) Provisional application No. 61/497,785, filed on Jun. 16, 2011.

(51) Int. Cl.
*B01J 8/24* (2006.01)
*F16K 5/06* (2006.01)
(Continued)

(52) U.S. Cl.
CPC .............. *B01J 8/003* (2013.01); *B01J 8/0045* (2013.01); *B01J 8/1827* (2013.01); *B01J 8/24* (2013.01);
(Continued)

(58) Field of Classification Search
None
See application file for complete search history.

(56) References Cited

U.S. PATENT DOCUMENTS 3,012,861 A * 12/1961 Ling ........................... 423/349
4,137,935 A    2/1979 Snowdon
(Continued)

FOREIGN PATENT DOCUMENTS

CN    201844059 U    5/2011
CN    201866311 U    6/2011
(Continued)

OTHER PUBLICATIONS

English language abstract and translation for CN 201844059 extracted from espacenet.com database on Mar. 14, 2014, 13 pages.
(Continued)

*Primary Examiner* — Lessanework Seifu
(74) *Attorney, Agent, or Firm* — Cantor Colburn LLP (57) ABSTRACT A dome valve selectively dispenses a silicon product from a chamber of a vessel. The dome valve comprises a valve body defining a pass-through channel in communication with the chamber of the vessel to allow the silicon product to exit the vessel. The dome valve also comprising a valve seat defining an opening through which the silicon product enters the pass-through channel. The dome valve further comprising a domed body having a semi-hemispherical configuration. The domed body has a sealing surface. The domed body is rotatable between a closed position and an open position for allowing the selective dispensing of the silicon product from the vessel.

21 Claims, 6 Drawing Sheets

(51) Int. Cl.
*B01J 8/00* (2006.01)
*B01J 8/18* (2006.01)
*B65G 53/46* (2006.01)

(52) U.S. Cl.
CPC .......... *B65G 53/4658* (2013.01); *F16K 5/0605* (2013.01); *B01J 2208/00752* (2013.01); *B01J 2208/00761* (2013.01)

(56) References Cited

U.S. PATENT DOCUMENTS

| | | |
|---|---|---|
| 4,213,937 A | 7/1980 | Padovani et al. |
| 4,806,317 A | 2/1989 | Boone et al. |
| 5,322,670 A | 6/1994 | Ibrahim et al. |
| 5,358,603 A | 10/1994 | Ibrahim et al. |
| 5,642,751 A | 7/1997 | Crawley |
| 5,798,137 A | 8/1998 | Lord et al. |
| 6,206,024 B1 | 3/2001 | Naberhaus |
| 6,412,756 B1 | 7/2002 | Hayduk |
| 6,437,534 B1 | 8/2002 | Kakino et al. |
| 7,641,939 B2 | 1/2010 | Liu |
| 7,927,984 B2 | 4/2011 | Molnar |
| 2003/0159647 A1 | 8/2003 | Arvidson et al. |
| 2004/0217318 A1 | 11/2004 | Hayduk |
| 2008/0056979 A1 | 3/2008 | Arvidson et al. |
| 2008/0232907 A1 | 9/2008 | Snowdon |
| 2010/0122744 A1 | 5/2010 | Mullen |
| 2012/0148728 A1* | 6/2012 | Canle et al. ............ 427/58 |

FOREIGN PATENT DOCUMENTS

| | | |
|---|---|---|
| DE | 10319302 B3 | 8/2004 |
| JP | 06127922 A | 5/1994 |
| JP | 06127923 A | 5/1994 |
| JP | 06127925 A | 5/1994 |

OTHER PUBLICATIONS

English language abstract and translation for CN 201866311 extracted from espacenet.com database on Mar. 14, 2014, 8 pages.
English language abstract for DE 10319302 extracted from espacenet.com database on Mar. 17, 2014, 10 pages.
English language abstract and translation for JP 06-127922 extracted from espacenet.com database on Mar. 14, 2014, 30 pages.
English language abstract and translation for JP 06-127923 extracted from espacenet.com database on Mar. 14, 2014, 26 pages.
English language abstract and translation for JP 06-127925 extracted from espacenet.com database on Mar. 14, 2014, 25 pages.
Roto-Flate, Inflatable Seal Spherical Valves, http://www.macawber.com/page.asp?p=Dome%20Valve, 4 pages.
Roto-Disc, Heavy Duty Spherical Valves, http://www.macawber.com/page.asp?p=Dome%20Valve, 6 pages.
International Search Report for Application No. PCT/US2012/042438 dated Sep. 4, 2012, 5 pages.

* cited by examiner

SOLIDS PROCESSING VALVE

CROSS REFERENCE TO RELATED APPLICATION

This application is the National Stage of International Patent Application No. PCT/US2012/042438, filed on Jun. 14, 2012, which claims priority to and all the advantages of U.S. Patent Application No. 61/497,785 filed on Jun. 16, 2011, which is incorporated by reference.

BACKGROUND OF THE INVENTION

1. Field of the Invention

The invention generally relates to a dome valve. More specifically, the invention relates to a dome valve used to selectively dispense a silicon product.

2. Description of the Related Art

The use of valves to dispense a silicon product is known in the art. Typically, a conventional valve, such as a butterfly valve, a ball valve, or a slide gate valve, is coupled to a vessel, which contains the silicon product. The conventional valve is operated between open and closed positions. When the conventional valve is in the open position, the silicon product is dispensed and when the conventional valve is in the closed positions, the silicon product is retained within the vessel. The conventional valve is prone to jamming when particles of the silicon product come into contact with a sealing surface of the conventional valve. More specifically, the silicon particle can become jammed within the conventional valve thereby preventing the conventional valve from operating between the open and closed positions.

Generally, it is desirable to produce the silicon product with a high purity such that contamination of the silicon product by impurities is limited. As such, producing the silicon product with high purity involves careful control of environmental conditions to which the silicon product is subjected. Generally, the conventional valves may introduce impurities to the silicon product because the silicon product contacts the conventional valve. More specifically, the conventional valve is made from a metal, such as stainless steel. The silicon product is abrasive and during operation of the conventional valve, the silicon product can scrape the conventional valve, which results in the separation of the metal of the conventional valve. Exposure of the silicon product to the metal that is separated from the conventional valve can contaminate the silicon product thereby reducing a purity of the silicon product. For silicon products with high purity, contamination levels as low as 1 part per billion atomic (ppba) can influence the utility of the silicon product.

For example, when the conventional valve is coupled to a fluidized bed reactor, the silicon product produced by the fluidized bed reactor comes into direct physical or atmospheric communication with the conventional valves, which can contribute impurities to the silicon product thereby contaminating the silicon product. While methods, such as chemical etching, can be used to surface clean the silicon product to remove surface impurities, these methods add significant processing costs. Thus, contamination of the silicon product should be avoided.

As mentioned above, the conventional valves may become jammed thereby preventing the valve from moving between the open and closed positions. When the conventional valve is coupled to the fluidized bed reactor and becomes jammed, the fluidized bed reactor must be serviced, which increases manufacturing time to produce the silicon product. Moreover, to service the conventional valve, the fluidized bed reactor must be shut down, which results in thermal cycling of components within a reaction chamber of the fluidized bed reactor. Thermal cycling of components within the reaction chamber that are made from graphite and quartz, such as a housing of the reaction chamber, heating elements, and electrodes, can lead to premature breakage of these components. Additionally, when the conventional fluidized bed reactor is serviced, the silicon product that has been produced can become contaminated through interaction with an operator clearing the jammed conventional valve. Accordingly, there remains an opportunity to provide an improved valve for dispensing silicon product from a vessel.

SUMMARY OF THE INVENTION AND ADVANTAGES

A dome valve selectively dispenses a silicon product from a chamber of a vessel. The dome valve comprises a valve body defining a pass-through channel in communication with the chamber of the vessel to allow the silicon product to exit the vessel. The dome valve also comprising a valve seat defining an opening through which the silicon product enters the pass-through channel. The dome valve further comprises a domed body having a semi-hemispherical configuration. The domed body has a sealing surface. The domed body is rotatable between a closed position and an open position.

In the closed position, the sealing surface of the domed body engages the valve seat for forming a primary seal of the pass-through channel to prevent the selective dispensing of the silicon product from the fluidized bed reactor. In the open position, the opening defined by the valve seat is at least partially unobstructed by the sealing surface of the domed body for allowing the selective dispensing of the silicon product from the fluidized bed reactor.

Accordingly, the dome valve can selectively dispense the silicon product while minimizing a risk of jamming of the dome valve. Additionally, there is less interaction between the silicon product and the dome valve as the silicon product moves through the pass-through channel of the dome valve thereby reducing a risk of contaminating the silicon product.

BRIEF DESCRIPTION OF THE DRAWINGS

Other advantages of the present invention will be readily appreciated, as the same becomes better understood by reference to the following detailed description, when considered in connection with the accompanying drawings wherein.

DETAILED DESCRIPTION OF THE EXEMPLARY EMBODIMENT

Referring to the Figures, wherein like numerals indicate corresponding parts throughout the several views, a dome valve is generally shown at 20. The dome valve 20 is also known as a solids processing valve and it can also be referred to as a spherical dome valve or a spherical disc valve. At least one dome valve 20 is coupled to a vessel containing a silicon product 22 for selectively dispensing the silicon product 22 from the vessel. It is to be appreciated that the vessel may contain more than one dome valve 20.

Figure 1:
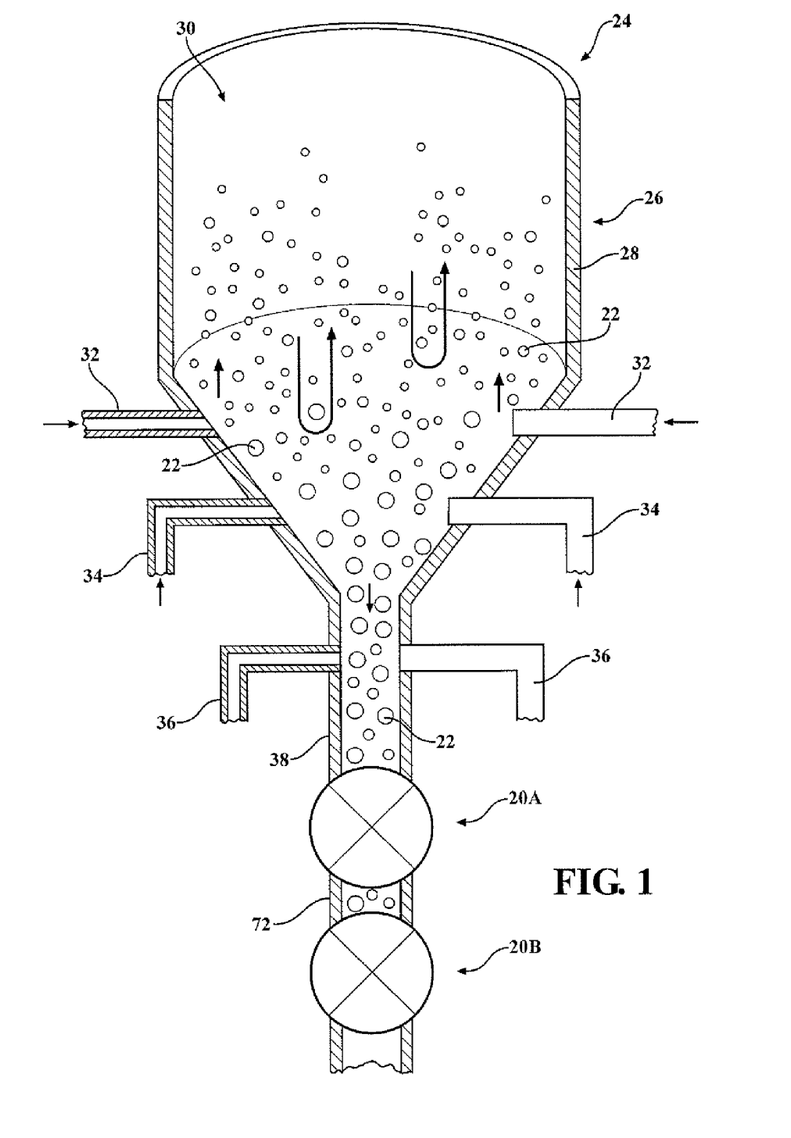
FIG. 1 is a schematic view of a fluidized bed reactor.

With reference to FIG. 1, the vessel may be a fluidized bed reactor 24. As described in detail below, the fluidized bed reactor 24 typically produces the silicon product 22 by growing silicon on seed particles. However, it is to be appreciated that the silicon product 22 can be manufactured by any suitable method. The dome valve 20 is coupled to the fluidized bed reactor 24 for selectively dispensing the silicon product 22 from the fluidized bed reactor 24. It is to be appreciated that the dome valve 20 may be coupled to any vessel, such as a storage hopper or any type of reactor in addition to the fluidized bed reactor described below. In such cases, the dome valve 20 selectively dispenses the silicon product 22 from a chamber of the vessel.

Generally, the fluidized bed reactor 24 produces the silicon product 22 while limiting an amount of impurities imparted to the silicon product 22. An impurity or impurities, as the terms are generally used herein, are defined as an element or a compound the presence of which is undesirable in the silicon product 22. For example, the impurities of concern typically include aluminum, arsenic, boron, phosphorus, iron, nickel, copper, chromium, and combinations thereof. Generally, limiting impurities present in the silicon product 22 deposited results in a high purity of the silicon product 22. High purity, as the term is used herein, means that the silicon product 22 has an impurity content of less than or equal to 1,000 parts per billion atomic. However, it is to be appreciated that in the area of producing the silicon product 22, there are additional distinctions between known silicon products, which can be made based on sequentially lower impurity contents.

While the above threshold for characterizing the silicon product 22 as having a high purity provides an upper limit for the impurity content, the silicon product 22 can still be characterized as high purity with substantially lower impurity content than the threshold set forth above. In particular, the silicon product 22 can have an impurity content of less than or equal to 3 parts per billion atomic, alternatively less than or equal to 500 parts per trillion atomic and yet may still be considered high purity silicon product 22.

The fluidized bed reactor 24 may be any suitable type of fluidized bed reactors. An example of a suitable fluidized bed reactor for the present invention is described in U.S. Pat. No. 7,927,984, which is incorporated by reference. The fluidized bed reactor 24 comprises a housing 26. The housing 26 has at least one wall 28 defining a reaction chamber 30 of the fluidized bed reactor 24. The wall 28 of the housing 26 also defines at least one particle inlet 31 for allowing the seed particles to enter the reaction chamber 30. The seed particles can be injected into the reactor chamber 30 at a variety of location. For example, the seed particles can be injected near a gas distributor or a processing gas inlet 34 or above a freeboard section of the fluidized bed reactor 24. The wall 28 of the housing 26 may define the processing gas inlet 34 for introducing at least one processing gas into the reaction chamber 30 to fluidize the seed particles. Said differently, the gas inlet 34 allows the process gas to enter the reaction chamber 30. The wall 28 of the housing also defines a gas inlet 36 for adding hydrogen to strip the reaction gas and to cool the particles 22.

Generally, the seed particles are placed into the reaction chamber 30 and subsequently fluidized. The seed particles typically comprise silicon. Sources of seed particles are known in the art. For example, the seed particles may be obtained by mechanical attrition of granular polycrystalline silicon or by crushing polycrystalline silicon produced in a Siemens reactor.

Typically, the process gas includes at least one fluidizing process gas and at least one reactant process gas. The fluidizing process gas is employed to fluidize the seed particles within the reaction chamber 30 and acts as diluents for the reactant process gas. The reactant process gas is employed to grow silicon on seed particles. It is to be appreciated that the fluidizing process gas and the reactant process gas may be one in the same. For example, the reactant process gas may be employed to fluidize the seed particles and to grow silicon on the seed particles. Typically, the fluidizing process gas comprises hydrogen, argon, helium, nitrogen, or a combination thereof. Generally, the reactant process gas comprises silicon. More specifically, the reactant process gas comprises hydrogen and a silicon monomer. Any silicon based precursor that can form solid phase silicon could be used as the monomer (e.g., trichlorosilane, silane, dichlorosilane, tribromosilane, silicon tetraiodide, and combination of thereof). In the preferred embodiment, the silicon monomer may be selected from the group of silane and trichlorosilane.

The housing 26 of the fluidized bed reactor 24 may also define at least one etching gas inlet 32 for allowing an etching gas to be introduced into the reaction chamber 30. Alternatively, the etching gas may be introduced into the reaction chamber 30 through the gas inlet 34 with the process gas. The etching gas typically comprises tetrachlorosilane. The etching gas may optionally further include a diluent gas, such as nitrogen or argon, or any other gas that does not affect the growth of silicon on the seed particles. Without wishing to be bound by theory, it is thought that the etching gas drives the reaction near the wall 28 of the fluidized bed reactor 24 to an etch mode rather than a deposition mode. The local etch mode prevents and/or removes silicon deposits on the wall 28 of the fluidized bed reactor 24.

The fluidized bed reactor 24 may be integrated with a Siemens reactor such that the etching gas and/or the process gas employed in the reaction chamber 30 of the fluidized bed reactor 24 are derived from a vent gas from the Siemens reactor. Said differently, the etching gas and/or the process gas may comprise all or a portion of the vent gas stream from the Siemens reactor. It is to be appreciated that the vent gas stream from the Siemens reactor may be supplemented with the either the reactant process gas by adding additional silane and/or trichlorosilane. Additionally, the vent gas stream from the Siemens reactor may be supplemented with the fluidizing process gas. Feeding the vent gas stream from the Siemens reactor directly into the fluidized bed reactor 24 may offer the advantage of energy savings by having to provide less heat to the fluidized bed reactor 24.

Generally, a heating device is used to heat the reaction chamber 30 to a temperature sufficient to decompose the silicon containing process gas. The heating of the reaction chamber 30 results in a heating of the seed particles within the reaction chamber 30. The seed particles are heated to a deposition temperature. The heating of the reaction chamber 30 can be accomplished by any suitable method. For example, the fluidized bed reactor 24 may use resistance heating, microwave energy, radio frequency inductive heating, or infrared radiation to heat the reaction chamber 30. Typically, the deposition temperature is of from about 900 to about 1410, more typically of from about 950 to about 1300, and even more typically of from about 950 to about 1250 degrees centigrade.

The reaction chamber 30 may also be pressurized during operation. Said differently, the reaction chamber 30 may have a pressure that is greater than the standard atmospheric pressure. The pressure inside the reaction chamber 30 is typically at least 2, more typically of from about 5 to about 15, and even more typically of from about 5 to about 8 atmospheres. One skilled in the art would recognize that the upper limit may be exemplary and not limiting based on the chemistry; however, it may be impractical for the pressure in the reaction chamber 30 to exceed 15 atmospheres.

Once the deposition temperature is reached, the decomposition of the reactant process gas silicon occurs. The decomposition of the reactant process gas, which contains silicon, results in the growth of silicon on the seed particles within the reaction chamber 30 to produce the silicon product 22. More specifically, the decomposition of either the silane and/or trichlorosilane results in silicon being deposited on a surface of the seed particles thereby producing the silicon product 22.

Generally, the silicon product 22 is in bead form. Typically, the silicon product 22 is in bead form with a sphericity above 0.5. The silicon product 22 has an Sauter mean diameter of from about 0.5 to about 4, more typically of from about 0.6 to about 1.6 millimeters. However, it is to be appreciated that the silicon product 22 may be in flakes having sphericity between of from about 0.1 to about 0.5, rather than the beads described above. When the silicon product 22 is the flakes, the flakes are typically of from about 100 to about 1,000, more typically of from about 300 to about 700, and even more typically of from about 300 to about 500 microns. Once formed, the silicon product 22 is removed from the reaction chamber 30 of the fluidized bed reactor 24. As such, the housing 26 of the fluidized bed reactor 24 defines a discharge outlet for allowing the silicon product 22 to exit the reaction chamber 30. Generally, a first pipe segment 38 extends from the housing 26 of the fluidized bed reactor 24. The first pipe segment 38 has a hollow interior in communication with the discharge outlet for allowing the silicon product 22 to be removed from the reaction chamber 30 of the fluidized bed reactor 24.

As introduced above, the dome valve 20 is coupled to the housing 26 for selectively dispensing the silicon product 22 from the fluidized bed reactor 24. More specifically, the dome valve 20 is coupled to the first pipe segment 38. Generally, the dome valve 20 has an open position and a closed position, which will be described in detail below. The dome valve 20 retains the silicon product 22 when in the closed position and dispenses the silicon product 22 in the open position.

Figure 2:
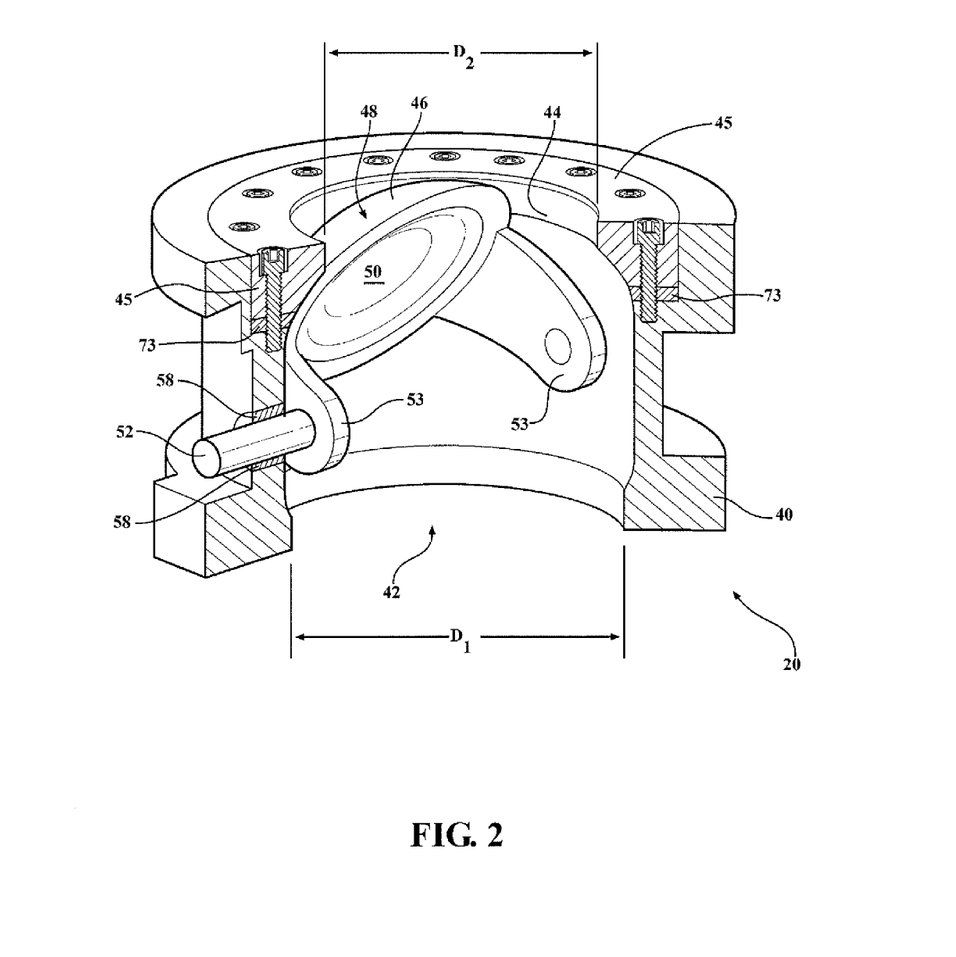
FIG. 2 is a perspective cross-sectional view of a dome valve for use with the fluidized bed reactor showing the dome valve having a domed body.

With reference to FIG. 2, the dome valve 20 comprises a valve body 40, which defines a pass-through channel 42. The pass-through channel 42 is in communication with the reaction chamber 30 to allow the silicon product 22 to exit the fluidized bed reactor 24. When the first pipe segment 38 is present, the pass-through channel 42 is in communication with the hollow interior of the first pipe segment 38. The pass-through channel 42 has a diameter D1, which is typically of from about 50 to about 200, more typically of from about 50 to about 150, and even more typically of from about 75 to about 100 millimeters.

The dome valve 20 also comprises a valve seat 44 coupled to the valve body 40 within the pass-through channel 42. The valve seat 44 is coupled to the valve body 40 and extends into the pass-through channel 42. A seat retaining ring 45 may be couple to the valve body 40 for securing the valve seat 44 to the valve body 40 within the pass-through channel 42. For example, the seat retaining ring 45 may compress or sandwich the valve seat 44 against the valve body 40. Generally, the seat retaining ring 45 is bolted to the valve body 40 with the valve seat 44 disposed between the seat retaining ring 45 and the valve body 40. It is to be appreciated that the valve seat 44 may be integral to the seat retaining plate 45.

The valve seat 44 defines an opening through which the silicon product 22 enters the pass-through channel 42 of the dome valve 20. The opening defined by the valve seat 44 has a pass-through diameter D2 that is smaller than the diameter D1 of the pass-through channel 42. Typically, the pass-through diameter D2 defined by the valve seat 44 is of from about 25 to about 150, more typically of from about 50 to about 100, and even more typically of from about 50 to about 75 millimeters.

The valve seat 44, because the pass-through diameter D2 is less than the diameter D1 of the pass-through channel 42, the valve seat 44 is exposed to prolonged contact with the silicon product 22, which is abrasive. As such, it is desirable for the valve seat 44 to be made from a hard material such that the valve seat 44 can withstand contact with the silicon product 22 with minimal wear to the valve seat 44. Limiting the wear of the valve seat 44 prevents the silicon product 22 from being contaminated by a material of the valve seat 44. The material of the valve seat 44 typically has a hardness on the Rockwell A scale above 83.5, more typically of from about 83.5 to about 94.2, even more typically of from about 84.0 to about 91.0, and still more typically of from about 86.0 to about 90.

Figure 3:
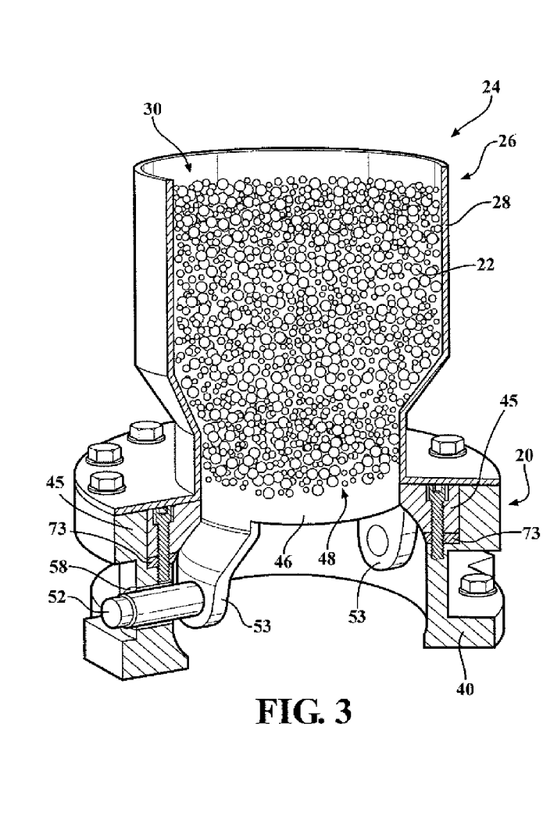
FIG. 3 is a perspective cross-sectional view of the dome valve with the domed body in the closed position and retaining a silicon product.
Figure 4:
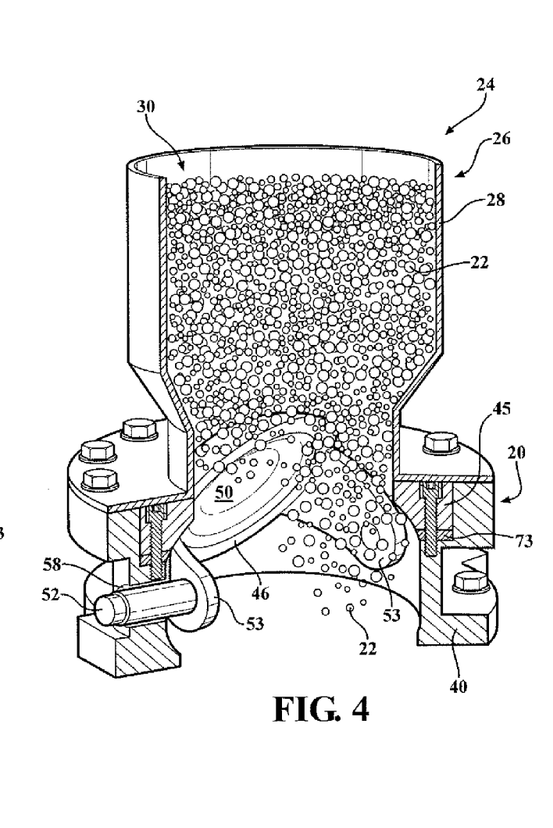
FIG. 4 is a perspective cross-sectional view of the dome valve with the domed body in a partially open position and dispensing the silicon product.

The dome valve 20 further comprises a domed body 46 having a semi-hemispherical configuration. With reference to FIGS. 3 and 4, the domed body 46 is rotatably disposed within the pass-through channel 42 between a closed position and an open position. The domed body 46 has a sealing surface 48 and an interior surface 50 spaced from the sealing surface 48. In the closed position, the sealing surface 48 of the domed body 46 engages the valve seat 44 for forming a primary seal of the pass-through channel 42. Additionally, in the closed position, the domed body 46 completely blocks the pass-through diameter D2 of the opening defined by the valve seat 44. As shown in FIG. 3, the primary seal created when the domed body 46 is in the closed position prevents the selective dispensing of the silicon product 22 from the fluidized bed reactor 24. Alternatively, as shown in FIG. 4, when the domed body 46 is in the open position, the opening defined by the valve seat 44 is at least partially unobstructed by the domed body 46 for allowing the selective dispensing of the silicon product 22 from the fluidized bed reactor 24. Said differently, in the open position, the domed body 44 does not completely block the pass-through diameter D2 of the opening defined by the valve seat 44. It is to be appreciated that when the domed body 46 is in the open position, the opening defined by the valve seat 44 may be partially obstructed while still allowing the silicon product 22 to pass through the opening. Additionally, when the dome body 46 is in the open position, the opening defined by the valve seat 44 may be completely unobstructed by the dome body 46. For example, the domed body 46 may have a plurality of preset open positions with each of the preset open positions resulting in a different size of the opening defined by the valve seat 44. Said differently, a size of the opening defined by the valve seat 44 can be changed by changing which of the plurality of preset open positions the domed body 46 is in. Controlling the size of the opening defined by the valve seat 44 controls a rate of the selective dispensing of the silicon product 22 from the fluidized bed reactor 24.

Generally, the domed body 46 is sphere like except that a segment of the sphere has been removed. Said differently, the domed body 46 resembles a portion of a hollow sphere. More specifically, the sealing surface 48 of the domed body 46 is convexed for engaging the valve seat 44. The sealing surface 48 of the domed body 46 slides along the valve seat 44 as the domed body 46 rotates between the open and closed positions. The interior surface 50 of the domed body 46 is concaved for preventing the interior surface 50 from obstructing the pass-through channel 42 and the sealing surface 48 of the domed body 46 is convexed. However, it is to be appreciated that the interior surface 50 does not need to be completely concaved to avoid obstructing the pass-through channel 42. For example, an outer periphery of the interior surface 50 may be concaved with a center portion of the interior surface 50 flat or, alternatively, the interior surface 50 can be completely flat. Having the outer periphery of the interior surface 50 concaved also helps with clearing any of the silicon products 22 that may become stuck within the pass-through channel 42 by cutting through the stuck silicon particles 22 as the domed body 46 slides along the valve seat 44.

Although the pass-through channel 42 is slightly obstructed by the valve seat 44, which extending from the valve body 40 into the pass-through channel 42, typically, the domed body 46 does not obstruct the pass-through channel 42 when the domed body 46 is completely in the open position. More specifically, the valve seat 44 may screen the domed body 46 from obstructing the pass-through channel 42. The pass-through channel 42 is unobstructed by the domed body 46 because the interior surface 50 of the dome body is parallel to the sealing surface 48. The parallel shape of the interior surface 50 of the domed body 46 allows the domed body 46 to be fully located outside the pass-through diameter of the dome valve 20. Said differently, the interior surface 50 of the domed body 46 is concaved, which moves the interior surface 50 out of alignment with the opening defined by the valve seat 44. Therefore, the interior surface 50 of the domed body 46 does not cause interference with the silicon product 22 as it is dispensed.

Figure 5:
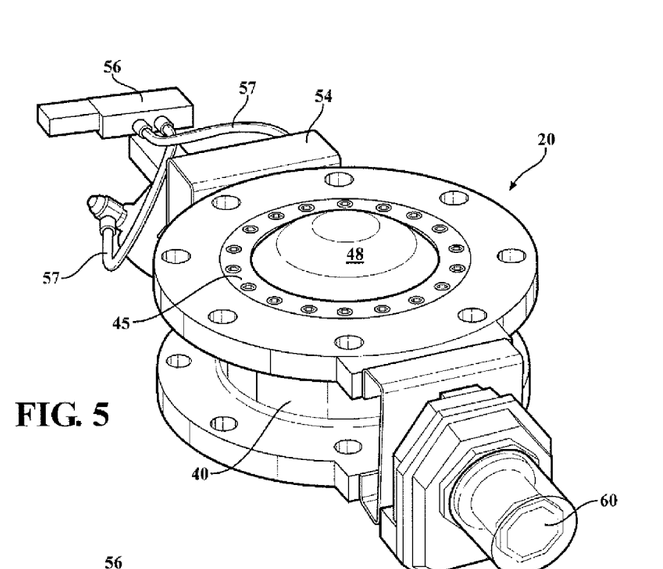
FIG. 5 is a perspective view of the dome valve for use with the fluidized bed reactor with the dome valve having a domed body in a closed position.
Figure 6:
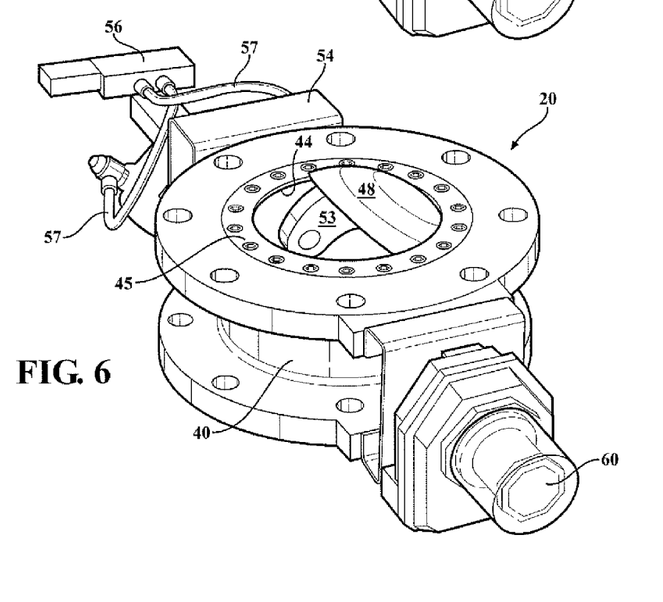
FIG. 6 is a perspective view of the dome valve with the domed body in a partially open position.

The dome valve 20 may include a shaft 52 coupled at one end to the domed body 46 with the other end of the shaft 52 extending though the valve body 40. Said differently, the valve body 40 defines a hole for allowing the shaft 52 to pass through the valve body 42. The domed body 46 typically has a pair of legs 53 extending from the interior surface 50. At least one of the pair of legs 53 is coupled to the valve body 40. The other one of the pair of legs 53 is coupled the shaft 52. Alternatively, both of the pair of legs 53 are coupled to the shaft 52. Generally, the shaft 52 is turned to rotate the domed body 46 between the open and closed positions. It is to be appreciated that the shaft 52 may be rotated by any suitable means. For example, although not required, the dome valve 20 may include an actuator 54, such as a vane actuator 54 for rotating the shaft 52 as shown in FIGS. 5 and 6. It is to be appreciated that other common actuator systems for valves may be used, such as spring-return actuators. A first solenoid valve 56 may be in communication with the actuator 54 for controlling the operation of the actuator 54. However, the actuator 54 may be operated by any suitable means.

The dome valve 20 may also include a bushing 58 disposed within the hole defined by the valve body 42. The bushing 58 seal around the shaft 52 for preventing the introduction of the outside gases while still allowing the shaft 52 to rotate. The bushing 58 may also incorporate O-rings to improve sealing capabilities of the bushing 58. The O-rings typically comprise a fluoropolymer elastomer such as Viton® rubber. The dome valve 20 may also include an indication beacon 60 to indicate the position of the dome body 46 within the pass-through channel 42, as shown in FIGS. 5 and 6. Said differently, the indication beacon 60 indicates whether the domed body 46 is in the open or the closed positions.

The primary seal formed by the engagement of the sealing surface 48 of the domed body 46 with the valve seat 44 is typically not adequate to prevent gases from passing through the dome valve 20. For example, the process gas may escape the reaction chamber 30 through the dome valve 20. Additionally, outside gases external to the fluidized bed reactor 24, such as oxygen in the atmosphere surrounding the fluidized bed reactor 24 may enter the reaction chamber 30 through the dome valve 20. The outside gases may introduce containments into the reaction chamber 30 thereby affecting the purity of the silicon product 22 produced. Additionally, the outside gases, in the case of oxygen, can negatively react with the process gas within the reaction chamber 30 thereby damaging the fluidized bed reactor 24.

Figure 7:
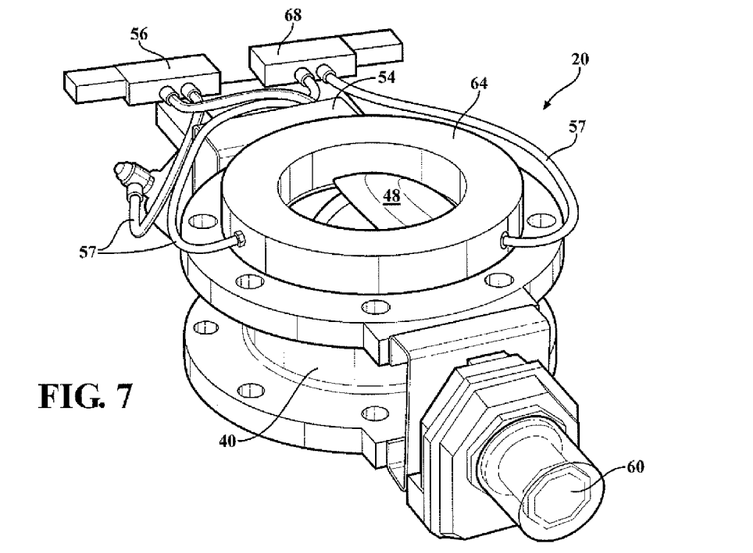
FIG. 7 is a perspective view of the dome valve with a seal retaining plate coupled to the dome valve.
Figure 8:
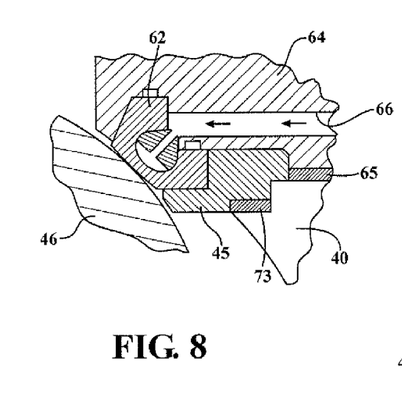
FIG. 8 is a cross-sectional view of a portion of the domed body and the retaining plate showing the inflatable seal engaging the domed body.

Therefore, as shown in FIGS. 7 and 8, the dome valve 20 may further comprise an inflatable seal 62 for engaging the sealing surface 48 of the domed body 46 to seal of the pass-through channel 42 instead of the valve seat 44. In addition to sealing the pass-through channel 42, the inflatable seal 62 prevents gases, such as the process gas within the reaction chamber 30 or outside gases outside of the reaction chamber 30 from passing through the dome valve 20. Said differently, the inflatable seal 62 prevents the reactant gas from exiting the fluidized bed reactor 24. The inflatable seal 62 also prevents outside gases external to the reaction chamber, such as oxygen, from entering the reaction chamber 30. When the silicon product 22 is within the vessel, the inflatable seal 62 prevents the outside gassed from entering the chamber of the vessel. The inflatable seal 62 for the dome valve 20 provides at least a Class VI seal, as defined by ANSI/FCI 70-2 1976 (R1982) standard for valve leakage classification, of the pass-through channel 42 when the domed body 46 is in the closed position and the inflatable seal 62 engages the sealing surface 48 of the domed body 46.

Figure 10:
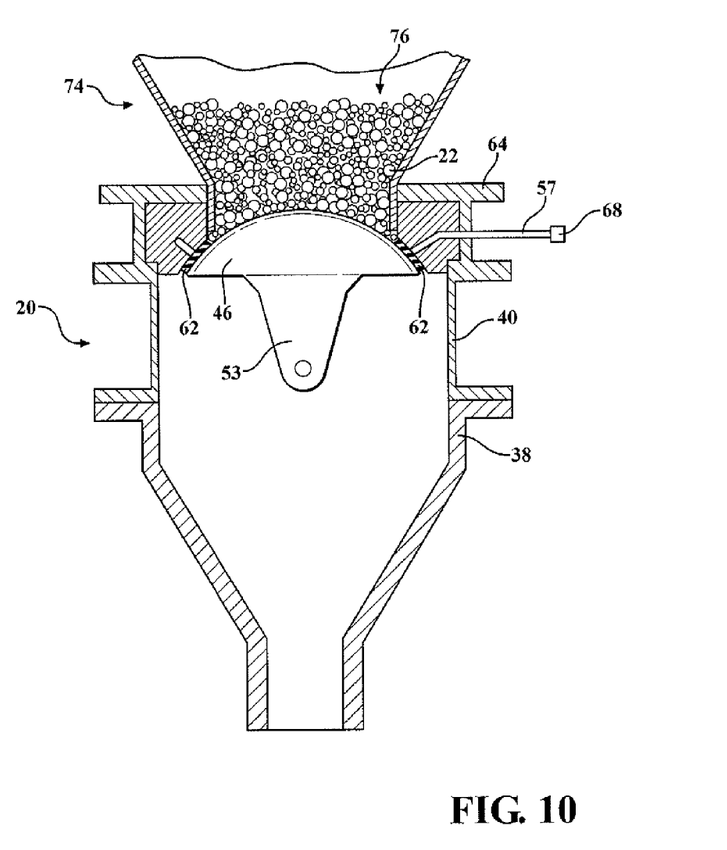
FIG. 10 is a cross-sectional view of the dome valve coupled to a storage hopper containing the silicon product.

With reference to FIGS. 7 and 10, the dome valve 20 may further comprise a seal retaining plate 64 coupled to the valve body 40. The seal retaining plate 64 houses the inflatable seal 62 and the inflatable seal 62 is expandable from the seal retaining plate 64. In this embodiment, the opening size in the seal retaining plate 64 defines the inlet diameter D2 of the dome valve 20. The seal retaining plate 64 may be a discrete component relative to the valve body 40. Said differently, the seal retaining plate 64 may be a separate component from the valve body 40 such that the seal retaining plate 64 is mechanically coupled to the valve body 40. For example, the seal retaining plate 64 may be coupled to the valve body 40 by bolts. However, it is to be appreciated that the seal retaining plate 64 can be coupled to the valve body 40 by any suitable method. It is also to be appreciated that the seal retaining plate 64 may be integral with the valve body 40. When the seal retaining plate 64 is a discrete component relative to the valve body 40, a plate gasket 65 may be disposed between the seal retaining plate 64 and the valve body 40 for providing a positive pressure seal of the pass-through channel 42.

Figure 9:
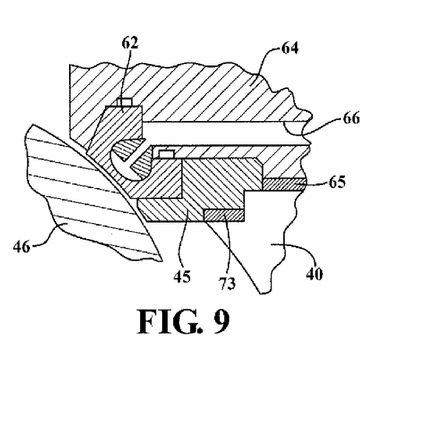
FIG. 9 is a cross-sectional view of a portion of the domed body and the retaining plate showing the inflatable seal spaced from the domed body.

With reference to FIGS. 8 and 9, the inflatable seal 62 is inflatable for extending from the seal retaining plate 64 to engage the sealing surface 48 of the domed body 46. Said differently, the inflatable seal 62 expands from the seal retaining plate 64 to engage the sealing surface 48 of the domed body 46. The engagement of the inflatable seal 62 with the sealing surface 48 of the domed body 46 seals of the pass-through channel 42. The seat retaining ring 45 may be notched for supporting inflatable seal 62. Said differently, the inflatable seal 62 may be disposed within the notch of the seat retaining ring 45 and rest against the seat retaining ring 45.

Tubing 57 may be coupled to the second solenoid valve 68 and the seal retaining plate 64 to allow inflation and deflation of the inflatable seal 62. The inflatable seal 62 typically comprises an elastomeric material, preferably fluoropolymer elastomers. An example of a suitable fluoropolymer elastomer is Viton® rubber. Generally, the seal retaining plate 64 defines at least one pathway 66, which is in communication with the inflatable seal 62. A pressure within the inflatable seal 62 is adjusted to operate the inflatable seal 62 between engagement with the sealing surface 48 of the domed body 46 and non-engagement with the sealing surface 48. Said differently, the pressure within the inflatable seal 62 is increased for expanding the inflatable seal 62 into engagement with the sealing surface 48 of the domed body 46. Alternatively, the pressure within the inflatable seal 62 is decreased for retracting the inflatable seal 62 from engaging the sealing surface 48 of the domed body 46.

The pressure within the inflatable seal 62 is typically increased by introducing of an inflating gas through the pathway 66 of the seal retaining plate 64 and into the inflatable seal 62. The pressure within the inflatable seal 62 is decreased by removing the inflating gas from the pathway 66 and thus the inflating gas is removed from the inflatable seal 62. It is to be appreciated that an inflating fluid may be used as an alternative to the inflating gas. Typically, a pressure regulator device may be used to control the pressure of the inflating gas within the pathway 66 and the inflatable seal 62. However, the pressure within the pathway 66 and the inflatable seal 62 may be controlled by any suitable method. As shown in FIG. 7, the dome valve 20 may include another second solenoid valve 68 in communication with the pathway 66 and the inflatable seal 62. The second solenoid valve 68 is operable between an open position and a closed position for respectively increasing and decreasing the pressure within the pathway 66 and the inflatable seal 62. The tubing 57 may also couple the second solenoid valve 68 to the pathway 66 of the seal retaining plate 64 for transferring the inflating gas from the second solenoid valve 68 to the pathway 66.

When employed, the inflating fluid is used in a similar manner as the inflating gas. Typically, the inflating gas within the pathway 66 and the inflatable seal 62 is an inert gas. Said differently, the inflating gas does not comprise an oxidizing gas, such as air, which may affect the operation of the fluidized bed reactor 24 in the event the inflatable seal 62 is ruptured. As such, the inflating gas is selected based on the process gas used in the reaction chamber 30. More specifically, the inflating gas is selected to prevent adverse chemical reactions with the process gas in the event the inflatable seal 62 fails and the inflating gas is mixed with the process gas in the reaction chamber 30. Typically, the inflating gas is selected from the group of argon, helium, hydrogen, and nitrogen. More typically, the inflating gas is non-reactive and preferable the inflating gas is nitrogen.

With reference to FIG. 1, it is to be appreciated that the fluidized bed reactor 24 may utilize additional dome valves 20. For example, the dome valve 20 described above may be a first dome valve 20A and a second dome valve 20B spaced from the first dome valve 20A. The plurality of valves 20A, 20B is spaced from each other a distance. Generally, the distance between the plurality of valves 20A, 20B is determined based on a volume of the silicon product 22 to be retained by each of the dome valves 20A, 20B. In such an embodiment employing the first and second dome valves 20A, 20B, the first dome valve 20A is coupled to the first pipe segment 38. A second pipe segment 72 is coupled to the first dome valve 20A opposite the first pipe segment 38 and the second dome valve 20B is coupled to the second pipe segment 72. Said differently, the first and second dome valves 20A, 20B are in series with each other. Providing the first and second dome valves 20A, 20B in series with the second dome valve 20B having the inflatable seal 62 reduces the burden of maintaining the process gas within the reaction chamber 30 while removing product from the reaction chamber 30.

Generally, the pass-through channel 42 of each of the first and second dome valves 20A, 20B are in communication with each other. A holding chamber is provided by the second pipe segment 72 between the first and second dome valves 20A, 20B to allow additional cooling of the silicon product 22 to occur outside of the reaction chamber 30 prior to the second dome valve 20B selectively dispensing the silicon product 22 from the holding chamber. Gas inlet 36 can be used for adding hydrogen to the silicon particles 22 to strip the reaction gas and cool the silicon particles 22.

Said differently, the silicon product 22 can be retained within a hollow interior of the second pipe segment 72 between the first and second dome valves 20A, 20B for allowing the silicon product 22 to cool outside the presence of the process gas. It is to be appreciated that the cooling of the silicon product 22 within the second pipe segment 72 is in addition to the cooling of the silicon product 22 that takes place within the first pipe segment 38 due to the hydrogen that is introduced through the gas inlet 36. As such, the silicon product 22 may not need the additional cooling within the second pipe segment 72.

Typically, the first dome valve 20A does not include the seal retaining plate 64 or the inflatable seal 62 such that the first dome only retains solids, such as the silicon product 22 and gases may pass through the first dome valve 20A. Additionally, the second dome valve 20B typically includes the seal retaining plate 64 and inflatable seal 62 for retaining solids and preventing gases, such as the process gas or the gases in the atmosphere outside the reaction chamber 30, from entering the reaction chamber 30. However, it is to be appreciated that both or neither the first and second dome valve 20B may include the seal retaining plate 64 and the inflatable seal 62. It is also to be appreciated that any number of dome valve 20s may be used simply by increasing the number of pipes used and interconnecting the dome valve 20s in series with one another.

As described above, it is beneficial to prevent impurities from contaminating the silicon product 22. Although not required, the dome valve 20 may be made from a non-contaminating material such that the silicon product 22 that contacts the dome valve 20 maintains high purity. Said differently, the dome valve 20 does not contribute impurities to the silicon product 22 as the silicon product 22 contacts the dome valve 20 because the dome valve 20 is made from a non-contaminating material. Generally, each of the valve seat 44, the domed body 46, and the valve body 40 defining the pass-through channel 42 comprise the non-contaminating material for preventing contamination of the silicon product 22.

Typically, the non-contaminating material is selected from the group of silicon, cemented carbide, and combinations thereof. More typically, the non-contaminating material is selected from the group of silicon-based materials, such as polycrystalline silicon, silicon carbide, silicon nitride, and non-silicon based materials, such as cemented tungsten carbide, and combinations thereof. It is to be appreciated that the silicon based material may be made from a high purity, non-doped, monocrystalline ingot obtained from the Czochralski or Float Zone processes. An additionally benefit of using silicon as the non-contaminating material of the valve seat 44 is that the silicon meets the requirements for the hardness of the valve seat 44. Typically, when the valve seat 44 comprises silicon, the valve seat 44 has a hardness of from about 900 to about 1050, more typically of from about 950 to about 1000 Vickers. When the valve seat 44 comprises the cemented carbides, the valve seat 44 has a hardness on the Rockwell A scale typically of from about 83.5 to about 94.2, more typically of from about 86.0 to about 90.0. Generally, the valve seat 44 is made from cemented carbides because the cemented carbides are typically tougher than silicon.

The non-contaminating material may be coupled to the other materials for coving portions of the dome valve 20 that will contact the silicon product 22. For example, the material of the valve seat 44 may be press-fit into another material to form the valve seat 44. Said differently, the valve seat 44 may comprise more than one material with the non-contaminating material press-fit into a second material. In such an embodiment, the second material may be of any type of metal suitable to retain the first material. Furthermore, the portions of the dome valve 20 that contacts the silicon product 22 may comprise a spray coating for preventing the dome valve 20 from contaminating the silicon product 22. The spray coating is beneficial for treating areas of the dome valve 20, which are not fabricated from silicon based non-contaminating materials, that are too difficult to apply the non-contaminating material to size. The spray coating may be a flame spray coating for adhering the spray coating to the non-contaminating material. For example, the spray coating may be applied via plasma or HVOF (high velocity oxygen fuel) spray techniques. The spray coating is typically selected from the group of cemented carbides, alumina, and silicon carbide. More typically, the spray coating is tungsten carbide with a cobalt binder.

Generally, the domed body 46 and the valve seat 44 are produced within required tolerance ranges to ensure the sealing surface 48 adequately engages the valve seat 44. However, it may be difficult to produce the domed body 46 and the valve seat 44 from the non-contaminating material while maintaining the required tolerance ranges to ensure the sealing surface 48 of the domed body 46 adequately engages the valve seat 44. As such, the valve seat 44 may be adjustable relative to the domed body 46 to account for dimensional variation of the domed body 46 and the valve seat 44 produced from the non-contaminating material that are outside the required tolerance ranges. Said differently, that ability to adjust the valve seat 44 relative to the domed body 46 expands the required tolerance ranges for producing the valve seat 44 and the domed body 46 such that the valve seat 44 and the domed body 46 can be made from the non-contaminating material. A shim 73 can be inserted between the seat retaining ring 45 and the valve seat 44 for adjusting the valve seat 44 toward the sealing surface 48 of the domed body 46. Additionally, the shim 73 may be inserted between the valve seat 44 and the valve body 40 to adjust the valve seat 44 away from the valve body 40. Additionally, when the seal retaining plate 65 is present, the shim 73 may be disposed between the seal retaining plate 65 and the valve body 40 for adjusting the inflatable seal 62 relative to the valve body 40.

Typically, the shim 73 is not exposed to the silicon product 22. However, a shim gasket may be used to prevent the silicon product 22 from contacting the shim 73. The shim 73 has a thickness, which is generally equal to a desired adjustment amount of the valve seat 44 relative to the valve body 40. Typically, the valve seat 44 is adjustable by at least 0.125 inches. However, it is to be appreciated that the shim 73 can be used to make any desired adjustment of the valve seat 44 relative to the domed body 46.

The dome valve 20 may further include a funnel or sloped surface for directing the flow of the silicon product 22 from the dome valve 20. Like the dome valve 20 itself, the funnel is typically made from a non-contaminating material. For solar applications, polymeric materials having no pigment can be used provided the temperatures of the silicon are below the softening temperatures of the respective polymers. For example, the non-contaminating material of the funnel is typically ultra high molecular weight polyethylene. Additionally, the first and second pipe segments 38, 72 that interconnect the first and second dome valves 20A, 20B may have a liner to prevent the first and second pipe segments 38, 72 from contaminating the silicon product 22. Suitable materials for the liner include high purity crystalline silicon and silicon carbide-coated graphite.

As alluded to above, the dome valve 20 may be coupled to any vessel, such as a storage hopper 74 or any type of reaction chamber besides the fluidized bed reactor 24 described above. In such embodiments, the dome valve 20 operates in a similar manner as described above. With reference to FIG. 10, the dome valve 20 is coupled to the storage hopper 74. The storage hopper 74 defines a chamber 76 for storing the silicon product 22. For example, the silicon product 22 may be placed within the storage hopper 74 after exiting the fluidized bed reactor 24 described above. It is to be appreciated that the dome valve 20 may be coupled directly to the storage hopper 74. Alternatively, the dome valve 20 may be coupled to a first pipe segment, which is coupled to and extends from the storage hopper 74. Additionally, just as with the fluidized bed reactor 24 described above, more than one dome valve 20 may be coupled to the storage hopper 74 is series with one another.

EXAMPLES

A first test dome valve, a second test dome valve, and a third test dome valve are produced according to the description above. For the first test dome valve, the valve seat, the domed body, the shaft, and the bushings are made from cemented tungsten carbide. The valve body of the first test dome valve is 316L stainless steel with the pass-through channel receiving the spray coating comprising tungsten carbide with the cobalt binder.

For the second test dome valve, the valve seat, the seat retaining plate, the domed body, are made from an intrinsic Czochralski silicon. The shaft and the bushings of the second test dome valve are made from cemented tungsten carbide. The valve body of the second test dome valve is 316L stainless steel with the pass-though channel receiving the spray coating comprising tungsten carbide with the cobalt binder.

For the third test dome valve, the valve seat is made from 316 stainless steel filled PTFE, which is covered by a stainless steel seat retaining plate. The shaft, the bushings, and the domed body of the third test dome valve are made from 316 stainless steel. The valve body and the seat retaining plate of the third test dome valve is 316 stainless steel. The pass-through channel the domed body of the third test dome valve receives the spray coating comprising tungsten carbide with the cobalt binder. The third test dome valve is a commercially available dome valve that utilizes only wear-resistant coatings and wear-resistant polymers. Examples of the third test dome valve are available from the Roto Disc Company of Milford Ohio.

Each of the first, second, and third test dome valves includes the funnel for directing the silicon product. The funnel is made from ultra high molecular weight polyethylene having no pigment fillers.

The silicon product has a known initial surface purity before the silicon product passes through the first and second test dome valves. A first sample of the silicon product is passed through the first test dome valve. A second sample of the silicon product is passed through the second test dome valve. A third sample of the silicon product is passed through the third test dome valve. A resulting surface purity is obtained for the first, second, and third samples passed through a respective one of the first, second, and third test dome valves. The resulting surface purity is obtained using a vapor phase digestion technique using high purity hydrofluoric acid with subsequent elemental analysis being performed on a high resolution inductively coupled plasma mass spectrometer. Such teachings are well known in the art for surface purity analysis on high purity polycrystalline silicon materials. The initial surface purity and the resulting surface purity of the first, second, and third samples are reported in Table 1 below.

TABLE 1

| Element | Initial Surface Purity of the First, Second, and Third Samples (ppba) | Resulting Surface Purity of the First Sample (ppba) | Resulting Surface Purity of the Second Sample (ppba) | Resulting Surface Purity of the Third Sample (ppba) |
| --- | --- | --- | --- | --- |
| Iron (Fe) | 1.51 | 8.86 | 4.78 | 72 |
| Nickel (Ni) | 0.26 | 0.88 | 0.81 | 48.9 |
| Chromium (Cr) | 0.17 | 0.37 | 0.45 | 72 |
| Copper (Cu) | 0.02 | 0.2 | 0.05 | 0.31 |
| Tungsten (W) | 0.02 | 0.9 | 0.32 | 39.1 |
| Cobalt (Co) | 0.001 | 0.06 | 0.06 | 5.69 |

As shown in Table 1, both the first sample, which passed through the first test dome valve having the valve seat and the domed body made from cemented tungsten carbide, and the second sample, which passed through the second test dome valve having the valve seat and domed body made from the intrinsic Czochralski silicon, show a significant improvement in the resulting surface purity of the silicon product as compared to the resulting purity of the silicon product passed through the third test dome valve. It is believed that the improvement of the resulting surface purity is directly related to the use of cemented tungsten carbide and the intrinsic Czochralski silicon materials.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fluidized bed reactor for producing a silicon product, said fluidized bed reactor comprising:
    a housing defining a reaction chamber;
    a particle inlet defined by said housing for allowing seed particles to enter said reaction chamber;
    a gas inlet defined by said housing for allowing a silicon containing process gas to enter said reaction chamber;
    a heating device for heating said reaction chamber to decompose the silicon containing process gas to grow silicon on the seed particles to produce the silicon product;
    a discharge outlet defined by said housing for allowing the silicon product to exit said reaction chamber; and
    a dome valve coupled to said housing for selectively dispensing the silicon product from said fluidized bed reactor, said dome valve comprising;
        a valve body defining a pass-through channel in communication with said reaction chamber to allow the silicon product to exit said fluidized bed reactor;
        a valve seat coupled to said valve body within said pass-through channel with said valve seat defining an opening through which the silicon product enters said pass-through channel;
        a domed body having a semi-hemispherical configuration and rotatably disposed within said pass-through channel with said domed body having a sealing surface and an interior surface spaced from said sealing surface; and
        an inflatable seal that is expandable to engage said sealing surface of said domed body to seal said pass-through channel to prevent the silicon containing process gas from exiting said fluidized bed reactor, wherein the inflatable seal is inflated with a gas that does not consist of air;
    wherein said domed body is rotatable within said pass-through channel between a closed position and an open position with said sealing surface of said domed body engaging said valve seat in said closed position for forming a primary seal of said pass-through channel to prevent the selective dispensing of the silicon product from said fluidized bed reactor and wherein said opening defined by said valve seat is at least partially unobstructed by said sealing surface of said domed body in said open position for allowing the selective dispensing of the silicon product from said fluidized bed reactor.

2. A fluidized bed reactor as set forth in claim 1 wherein said domed body has a plurality of preset open positions with each of said preset open positions of said domed body resulting in a different size of said opening thereby controlling a rate of the selective dispensing of the silicon product from said fluidized bed reactor.

3. A fluidized bed reactor as set forth in claim 1 wherein said material of said valve seat is selected from the group of silicon, cemented carbide, and combinations thereof.

4. A fluidized bed reactor as set forth in claim 1 wherein said dome valve further comprises a seat retaining ring coupled to said valve body within said pass-through channel with said material of said valve seat press-fit with said seat retaining ring for coupling said valve seat to said valve body within said pass-through channel.

5. A fluidized bed reactor as set forth in claim 1 wherein said domed body comprises anon-contaminating material selected from the group of silicon, cemented carbide, and combinations thereof.

6. A fluidized bed reactor as set forth in claim 1 wherein said valve body defining said pass-through channel comprises a non-contaminating material selected from the group of silicon, cemented carbide, and combinations thereof.

7. A fluidized bed reactor as set forth in claim 1-wherein each of said valve seat, said domed body, and said valve body defining said pass-through channel comprise a silicon material for preventing contamination of the silicon product.

8. A dome valve for coupling to a fluidized bed reactor to selectively dispense a silicon product from the fluidized bed reactor, with the fluidized bed reactor comprising a housing with the housing defining a reaction chamber for producing the silicon product and defining a discharge outlet for allowing the silicon product to exit the reaction chamber, said dome valve comprising:
 a valve body defining a pass-through channel in communication with said reaction channel to allow the silicon product to exit said fluidized bed reactor;
 a valve seat coupled to said valve body within said pass-through channel with said valve seat defining an opening through which the silicon product enters said pass-through channel;
 a domed body having a semi-hemispherical configuration and rotatably disposed within said pass-through channel with said domed body having a sealing surface and an interior surface spaced from said sealing surface; and
 an inflatable seal that is expandable to engage said sealing surface of said domed body to seal said pass-through channel to prevent the silicon containing process gas from exiting said fluidized bed reactor, wherein the inflatable seal is inflated with a gas that does not consist of air;
 wherein said domed body is rotatable within said pass-through channel between a closed position and an open position with said sealing surface of said domed body engaging said valve seat in said closed position for forming a primary seal of said pass-through channel to prevent the selective dispensing of the silicon product from said fluidized bed reactor; and
 wherein said opening defined by said valve seat is at least partially unobstructed by said sealing surface of said domed body in said open position for allowing the selective dispensing of the silicon product from said fluidized bed reactor; and wherein at least one of said valve seat, said domed body, and said valve body defining said pass-through channel comprise a non-contaminating material for preventing contamination of the silicon product.

9. A dome valve as set forth in claim 8 having a plurality of preset open positions with each of said preset open positions of said domed body resulting in a different size of said opening thereby controlling a rate of the selective dispensing of the silicon product from said fluidized bed reactor.

10. A dome valve as set forth in claim 8 wherein said valve seat comprises said non-contaminating material selected from the group of silicon, cemented carbide, and combinations thereof.

11. A dome valve as set forth in claim 8 further comprises a seat retaining ring coupled to said valve body within said pass-through channel with said non-contaminating material of said valve seat press-fit with said seat retaining ring for coupling said valve seat to said valve body within said pass-through channel.

12. A dome valve as set forth in claim 8 wherein said domed body comprises said non-contaminating material selected from the group of silicon, cemented carbide, and combinations thereof.

13. A dome valve as set forth in claim 8 wherein said valve body defining said pass-through channel comprises said non-contaminating material selected from the group of silicon, cemented carbide, and combinations thereof.

14. A dome valve as set forth in claim 8 wherein each of said valve seat, said domed body, and said valve body defining said pass-through channel comprise a silicon material for preventing contamination of the silicon product.

15. A dome valve for selectively dispensing a silicon product from a chamber of a vessel, said dome valve comprising:
 a valve body defining a pass-through channel in communication with the chamber of the vessel to allow the silicon product to exit the vessel;
 a valve seat coupled to said valve body within said pass-through channel with said valve seat defining an opening through which the silicon product enters said pass-through channel;
 a domed body having a semi-hemispherical configuration and rotatably disposed within said pass-through channel with said domed body having a sealing surface and an interior surface spaced from said sealing surface and with said interior surface being concaved; and
 an inflatable seal that is expandable to engage said sealing surface of said domed body to seal said pass-through channel to prevent the silicon containing process gas from exiting said vessel, wherein the inflatable seal is inflated with a gas that does not consist of air;
 wherein said domed body is rotatable within said pass-through channel between a closed position and an open position with said sealing surface of said domed body engaging said valve seat in said closed position for forming a primary seal of said pass-through channel to prevent the selective dispensing of the silicon product from the chamber of the vessel and wherein opening defined by said valve seat is at least partially unobstructed by said sealing surface of said domed body in said open position for allowing the selective dispensing of the silicon product from the chamber of the vessel; and
 wherein at least one of said valve seat, said domed body, and said valve body defining said pass-through channel comprise a non-contaminating material for preventing contamination of the silicon product.

16. A dome valve as set forth in claim 15 wherein said domed body has a plurality of preset open positions with each of said preset open positions of said domed body resulting in a different size of said opening thereby controlling a rate of the selective dispensing of the silicon product from said fluidized bed reactor vessel.

17. A dome valve as set forth in claim 15 wherein said valve seat comprises said non-contaminating material selected from the group of silicon, cemented carbide, and combinations thereof.

18. A dome valve as set forth in claim 15 further comprises a seat retaining ring coupled to said valve body within said pass-through channel with said non-contaminating material of said valve seat press-fit with said seat retaining ring for coupling said valve seat to said valve body within said pass-through channel.

19. A dome valve as set forth in claim 15 wherein said domed body comprises said non-contaminating material selected from the group of silicon, cemented carbide, and combinations thereof.

20. A dome valve as set forth in claim 15 wherein said valve body defining said pass-through channel comprises said non-contaminating material selected from the group of silicon, cemented carbide, and combinations thereof.

21. A dome valve as set forth in claim 15 wherein each of said valve seat, said domed body, and said valve body defining said pass-through channel comprise a silicon material for preventing contamination of the silicon product.

* * * * *